March 13, 1928.
W. WERNER
1,662,224
SHOCK ABSORBER FOR WALKING BEAMS
Filed March 23, 1926
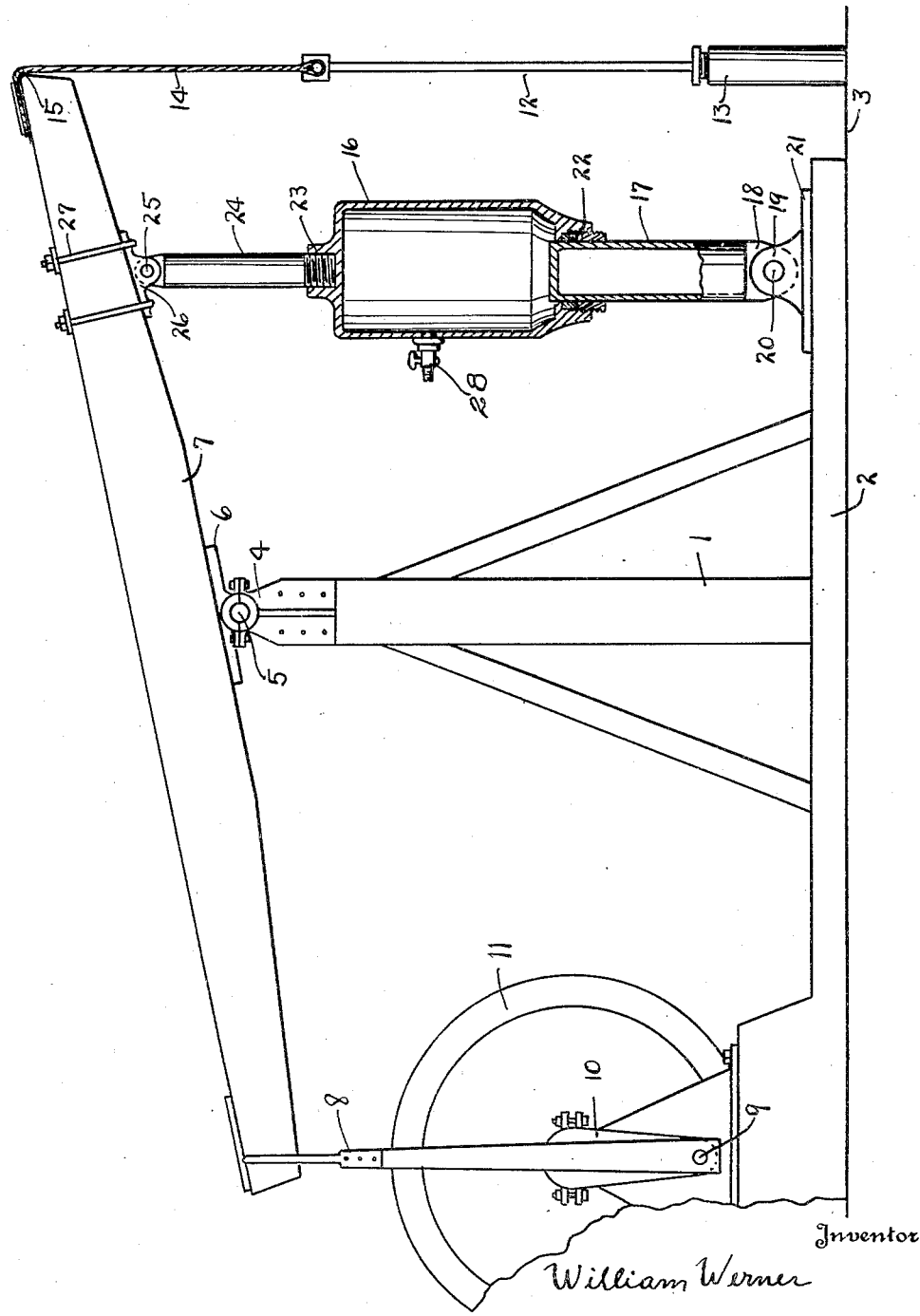
Inventor
William Werner
By Jesse R. Stone
his Attorney Patented Mar. 13, 1928.

1,662,224

UNITED STATES PATENT OFFICE.

WILLIAM WERNER, OF MEXIA, TEXAS.

SHOCK ABSORBER FOR WALKING BEAMS.

Application filed March 23, 1926. Serial No. 96,820.

My invention relates to shock absorbing devices designed for use in connection with load reciprocating means to take up the shock of the load. While the invention may be employed in various situations and in connection with varying types of apparatus, I have shown and described the invention as applied to a walking beam in well pumping apparatus.

It is an object of the invention to provide a shock absorber for use in the place of a counterbalance for resisting the sudden dropping of the pump rods on the down stroke, and to assist somewhat in raising the load on the upstroke of the pump plunger.

It is desired to place the shock absorber between the Samson post and the pump so that the device may act to resist the shock of the load without materially increasing the load on the pump platform as is now the case in the use of a counterbalance.

Another object is to provide a pneumatic shock absorber adapted for ready attachment to, or detachment from the walking beam so that it may be moved out of the way when not in use.

Referring to the drawing herewith, I have shown the invention partly in vertical section as attached to a standard pumping rig shown in side elevation.

The standard pumping rig shown in the drawing includes a Samson post 1 mounted upon a base 2, which is in turn supported upon the pump platform 3. The Samson post has a bearing plate 4 at its upper end adapted to receive the trunnion 5 upon the saddle 6 of the walking beam 7.

The walking beam is adapted to be reciprocated upon its pivot 5 by means of a pitman 8 connected at its upper end to the beam, and at its lower end to the wrist pin 9 on the crank arm 10 of the band wheel shaft, said band wheel being indicated at 11. The crank shaft and band wheel are mounted for rotation upon the base 2, previously noted.

The pump rod 12 is reciprocated within the tubing 13 of the well through a flexible connection 14 with the forward end 15 of the beam. The parts so far described are intended to represent parts known to be old in the art.

My shock absorber is placed between the Samson post 1 and the pump. It comprises two principal parts including an upper cylinder 16 and the piston 17 adapted to reciprocate therein. The said piston 17 is shown as being below the cylinder, although manifestly the arrangement may be reversed. The said piston is preferably hollowed out on its interior to make it as light as possible. Its lower end is formed with a flattened tongue 18 thereon fitting between two lugs 19, to which it is pivotally secured by means of a bearing pin 20. The said lugs 19 are secured upon a plate 21 firmly mounted upon the base.

The cylinder 16 is preferably of larger interior diameter than the piston 17. It has its upper end closed and its lower end is formed with a stuffing box 22 making a tight fit about the piston 17. The closed upper end of the cylinder is formed with an upper socket 23 threaded to receive the rod or pipe 24 pivotally attached to the pin 25, which forms a connection with a saddle 26 secured by clamps 27 to the beam at a point spaced slightly from the forward end of the beam.

I contemplate filling the interior of the cylinder 16, through valve 28, with some gaseous medium, such as air, under pressure. This pressure will tend to force the piston from the cylinder under ordinary conditions and when the force of the load is exerted upon the forward end of the beam on the down stroke, the cushion of air in the cylinder will resist the sudden drop of the load and act in its capacity as a shock absorber. On the upward stroke of the pump, the force of the compressed air in the cylinder will tend to assist in the raising of the pump rod and its load of liquid.

It will be noted that my shock absorber takes the place of the usual counterbalance weight now customarily placed upon the walking beam on the end away from the pump rod. It will have the advantage, however, of a much lighter construction, in that the weight of the shock absorber is much less than the usual counterbalance weight. The connection of the shock absorber with the walking beam at its upper end is one which may be quickly detached so that the shock absorber may be swung down parallel with the platform out of the way.

The further advantages of this construction will be apparent to those skilled in the art without further description, it being understood that this is only one embodiment which my invention may take. I do not wish therefore to be limited to this particular use.

What I claim is:

1. In a device of the character described including a walking beam adapted to reciprocate a pump rod, the combination of a shock absorbing device arranged adjacent the pump rod and adapted to cushion the down stroke of the rod, said device comprising a piston pivoted at its lower end, and a cylinder telescoping over said piston secured to said beam, said cylinder being of materially larger capacity than the volume of said piston and filled with air under pressure.

2. In a device of the character described, including a walking beam supported for a rocking movement and adapted to reciprocate a pump rod, the combination of a device arranged adjacent the pump rod, comprising a piston anchored between said pump rod and the support for said beam, and a cylinder secured to said beam and telescoping over said piston, said cylinder being filled with air under compression and having a capacity materially greater than the volume of said piston, whereby the action of said walking beam is balanced in the manner described.

In testimony whereof I hereunto affix my signature this 18th day of March A. D. 1926.

WILLIAM WERNER.